US008448182B2

(12) United States Patent
Sengodan

(10) Patent No.: US 8,448,182 B2
(45) Date of Patent: May 21, 2013

(54) SYSTEM AND METHOD FOR PAUSE AND RESUME MESSAGE OPERATIONS ON DESTINATIONS

(75) Inventor: Kathiravan Sengodan, Edison, NJ (US)

(73) Assignee: Oracle International Corporation, Redwood Shores, CA (US)

(*) Notice: Subject to any disclaimer, the term of this patent is extended or adjusted under 35 U.S.C. 154(b) by 892 days.

(21) Appl. No.: 11/284,689

(22) Filed: Nov. 22, 2005

(65) Prior Publication Data

US 2007/0083591 A1    Apr. 12, 2007

Related U.S. Application Data

(60) Provisional application No. 60/721,001, filed on Sep. 27, 2005.

(51) Int. Cl.
*G06F 9/46* (2006.01)
*G06F 15/167* (2006.01)

(52) U.S. Cl.
USPC ............................ 719/312; 709/213; 718/101

(58) Field of Classification Search .......... 709/201–207, 709/217–219, 214, 213; 715/752; 719/312–315, 719/318; 379/88.12; 455/412.12; 718/101
See application file for complete search history.

(56) References Cited

U.S. PATENT DOCUMENTS

| | | | |
|---|---|---|---|
| 6,922,685 B2* | 7/2005 | Greene et al. .......................... 1/1 |
| 6,976,072 B2* | 12/2005 | Mathieson ..................... 709/224 |
| 7,020,717 B1* | 3/2006 | Kovarik et al. ................ 709/238 |
| 7,177,917 B2* | 2/2007 | Giotta ............................ 709/219 |
| 7,240,054 B2* | 7/2007 | Adiba et al. ........................... 1/1 |
| 7,827,282 B2* | 11/2010 | Sorrentino et al. ........... 709/226 |
| 2002/0120697 A1* | 8/2002 | Generous et al. ............. 709/206 |
| 2003/0046395 A1 | 3/2003 | Fleming et al. |
| 2003/0105801 A1* | 6/2003 | Tse et al. ....................... 709/202 |
| 2003/0225875 A1* | 12/2003 | Revanuru et al. ............. 709/223 |
| 2004/0019645 A1* | 1/2004 | Goodman et al. ............. 709/206 |
| 2004/0139166 A1* | 7/2004 | Collison ........................ 709/207 |
| 2005/0071848 A1* | 3/2005 | Kempin ......................... 719/314 |
| 2005/0262215 A1* | 11/2005 | Kirov et al. ................... 709/207 |
| 2005/0283353 A1* | 12/2005 | Billingsley et al. ............. 703/23 |
| 2006/0168355 A1* | 7/2006 | Shenfield et al. ............. 709/250 |
| 2006/0265455 A1* | 11/2006 | Yakushev et al. ............. 709/206 |
| 2006/0274727 A1* | 12/2006 | Musayev et al. ............... 370/352 |

OTHER PUBLICATIONS

International Search Report for PCT/US06/02862, dated Jul. 3, 2008, 11 pages.

* cited by examiner

*Primary Examiner* — Charles E Anya
(74) *Attorney, Agent, or Firm* — Fliesler Meyer LLP

(57) ABSTRACT

The present invention enables messaging service users to programmatically and administratively control the system's behavior in the event of an external resource failure. A destination pause/resume feature enables the user to "pause" and "resume" the production and consumption of messages, that are newly produced or produced as a result of "in flight work" completion, on a given destination or all the destinations hosted by a single messaging service server programmatically. This description is not intended to be a complete description of, or limit the scope of, the invention. Other features, aspects, and objects of the invention can be obtained from a review of the specification, the figures, and the claims.

19 Claims, 4 Drawing Sheets

Production Paused - Internal state transition diagram 200

SYSTEM AND METHOD FOR PAUSE AND RESUME MESSAGE OPERATIONS ON DESTINATIONS

CLAIM OF PRIORITY

This application claims benefit from U.S. Provisional Patent Application No. 60/721,001, entitled "System and Method for Pause and Resume Message Operations on Destinations" by Kathiravan Sengodan, filed Sep. 27, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of management of message services.

BACKGROUND

A messaging service is an application program interface (API) that supports the formal communication known as messaging between computers in a network. Here, messaging is the creation, storage, exchange, and management of messages between producers who send/publish the messages to a queue of a destination and consumers who receive, subscribe, and browse the messages from the queue of the destination. Here, a message can be but are not limited to, text, image, voice, telex, fax, e-mail, paging, and other suitable electronic data describing events, requests, and replies over a communications network. The destination can be hosted on a messaging server.

Before arriving at its destination, a message can be at the status of "in-flight work" with respect producers and consumers. In-flight work messages associated with producers may include:

Un-born Messages

Messages that are produced by the producer with "birth time" (time to deliver) set in future are called un-born messages and are treated and counted as "pending" messages for the statistics purposes. Also, these "pending" messages are not available for the consumption from the destination by consumers yet.

Un-committed Messages

These are the messages that are produced by the producer as part of a transaction (using either user transaction or transacted session) and the transaction is still not committed or rolled back. These messages are also treated and counted as "pending" messages for the statistics purposes. Also these pending messages are not available for consumption from the destination by the consumers yet.

Quota Blocking Send

These are the messages that are produced by the producers but are not able reach the destination because of (either message or byte or both) quota limit on the destination and the producers are willing to block for a specific period of time for the quota to be available. These messages are invisible to the system and are not counted against any of the destination statistics.

In-flight work messages associated with consumers may include:

Un-acknowledged (Client Acknowledge Pending) Messages

These are the messages that have been successfully consumed by the clients, and are awaiting acknowledgements from the clients. These are "pending messages" which will be removed from the destination/system when the acknowledgement is received.

Un-committed Messages

These are the Messages that are consumed (received) by the clients within a transaction and the transaction is still not committed or rolled back. They willbe removed from the system when the clients successfully commit the transaction.

Rolled Back Messages

These are the messages that are put back on the destination because of a successful rollback of transactional receive by the consumers. These messages might or might not be ready for consumption (re-delivered) to the clients immediately, depending on the redelivery parameters. If there is a redelivery delay configured, then the messages are not available for consumption for that "delay" duration and are counted as "pending" in the destination statistics; if the redelivery limit is not exceeded after the "delay" period, they are delivered (made available for consumption) on that destination and are counted as "current" messages in the destination statistics; if the redelivery limit exceeds, then those messages will be moved to "error destination" if one configured or will be deleted (dropped) from the system.

Recovered Messages

These messages are similar to "ROLLED BACK MESSAGES" discussed above. Except that these messages appear on the queue because of an explicit call to session "recover" by the client.

Redelivered Messages

These are again similar to "ROLLED BACK MESSAGES" except that these messages may re-appear on the destination because of an un-successful delivery attempt to the client (consumer crash, close etc.).

Message arriving at a destination can be caused by either new producing operation from the producers or the completion of in-flight work messages. It is sometimes desirable to drain the queue at the destination empty before allowing any further messages to arrive, which requires the complete pause of the entire message production on the destination.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable messaging service users to programmatically and administratively control the system's behavior in the event of an external resource failure that would otherwise cause the messaging service to ignore the external failures and overload the system (both server and clients) by continuously accepting and delivering (re-delivering) messages. A destination pause/resume feature would enable the user to "pause" and "resume" the message production and consumption operations on a given destination or all the destinations hosted by a single messaging service server, either programmatically or administratively. Java® Messaging Service (JMS) provides a common interface to standard messaging protocols and also to special messaging services in support of Java® programs and it will be used as a non-limiting example to illustrate the various embodiments of the invention in the following context.

The present invention can be applied to directly impact producers, consumers and messages associated with only a single destination, or can be applied to change the "paused state" of a group of "destinations" at once. This would greatly help the user, especially the administrator, when he/she needs to pause a large number of destinations administratively. There are a couple of ways the destinations are being grouped (by means of configuration). One way is the use of JMS template mechanism to define the attribute values of all the derived destinations and the other way is using the JMS server as a container to host a group of destinations. Thus, the "boot time" behavior of the destination can be overridden by having the same configuration attribute(s) in both the JMS template and JMS server with the precedence defined clearly. The runtime behavior can be overridden by providing the same runtime APIs on both JMS server and JMS destination with a clearly defined precedence.

Figure 1:
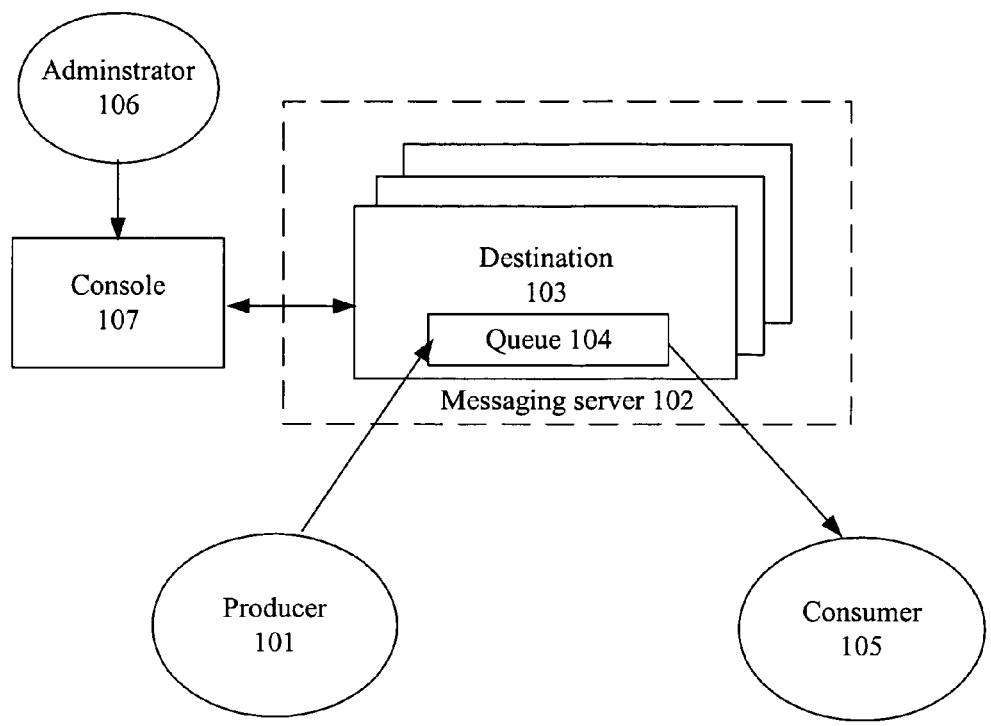
FIG. 1 is an illustration of an exemplary system for messaging service in one embodiment of the present invention.

FIG. 1 is an illustration of an exemplary system for messaging service in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a producer 101 is operable to "produce" (send and/or publish) one or more messages to one or more destinations hosted on a messaging server 102. Here, the one or more messages can be newly produced by the producer or "in flight work" as described earlier. Each destination 103 is operable to accept the one or more messages from the producer, store them in a data structure, which can be a queue 104, on the destination, and provide them to a consumer 105. The consumer may then "consume" (receive, subscribe, or browse) the one or more messages from the queue on the destination. An administrator 106 may programmatically pause and/or resume the production (acceptance) of the newly produced and/or the completed "in flight work" messages at the one or more destinations. It may also pause and/or resume the consumption of the one or more messages at the one or more destinations by the consumer.

In some embodiments, a console 107 can be provided, which is operable to expose the configurations of the one or more destinations to the administrator; and allow the administrator to perform its operations via a Web or GUI interface.

In some embodiments, the JMS destination can be "paused for production" (Production Pause) to prevent new messages from both new and existing producers attached to that destination. When the destination is "resumed from production pause" later, all new messages from both new and existing producers are allowed to be attached to that destination. Those messages resulted from the in-flight work completion will not be paused under the production pause operations.

Figure 2:
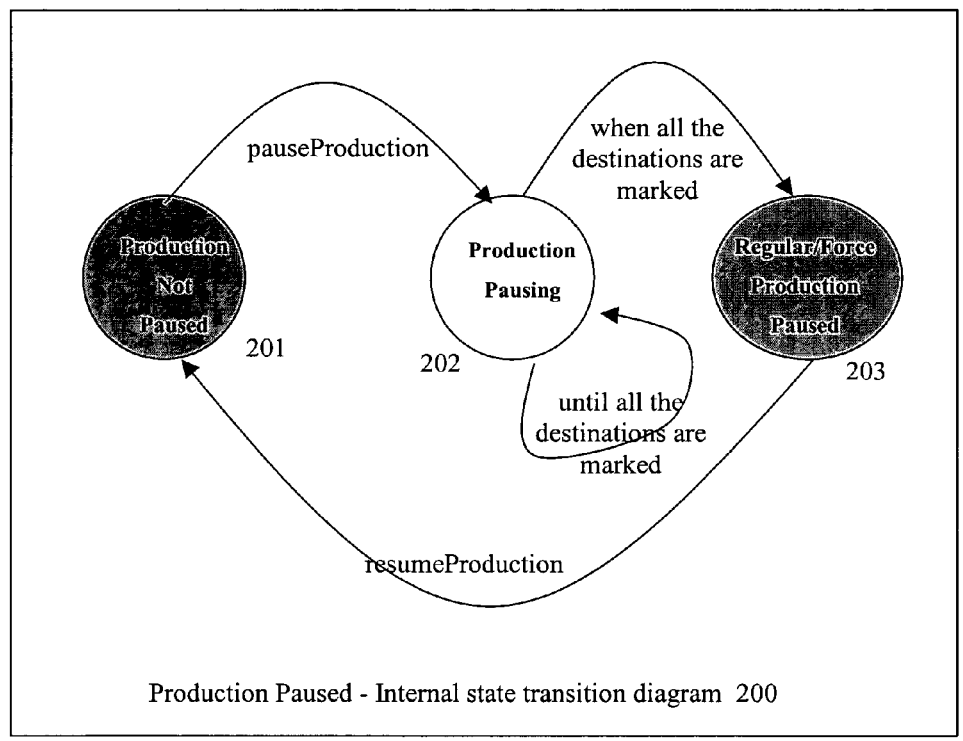
FIG. 2 is an exemplary internal state transition diagram for production pause in one embodiment of the present invention.

FIG. 2 is an exemplary internal state transition diagram 200 for production pause in one embodiment of the present invention. Destinations are initially at the state of "Production Not Paused" 201 during normal message production operation. When the user issues an instruction, e.g., "pauseProduction", to pause the destinations for new message production, the state of the destinations switches to a transitional "Production Pausing" state 202. When all the destinations to be paused have been marked, their state switches to the "Production Paused" state 203 at which all new send (this includes new quota blocking send) operations shall be failed immediately with an exception. However, all the existing in-flight work will be allowed to complete normally and the resulting messages will be made available on the destination for the consumers to consume. This normal pause operation will return the status as true or false, based on either there is any "in-flight work" associated with that destination work or not. Following a successful production pause operation (normal/force) on a destination, the user has to explicitly resume that destination for message production via an instruction, e.g., "resumeProduction", to allow for any further production activity on that destination. Successful completion of the "resume" operation will change the message production state of the destination from "Production Paused" 203 back to "production Not Paused" 201. When the new message production on a destination is successfully "paused" or "resumed" either at boot time or at runtime, there will be a log message in the server log indicating the same. In the event of failure to "pause/resume" the message production on a destination, the appropriate error/exceptions would be logged.

In some embodiments, a producer will not consider a destination in the state of "production paused" for production and it may choose other destinations that are available for "normal production" (i.e., in "production enabled" state) with production load balancing. Since the regular producers are steered away from the "production paused" destination, there won't be new messages coming in for the internal system consumers to accumulate. At the same time, the "production paused" state of the destination does not affect the internal system consumers from forwarding the messages to other member (target) destinations. For load balancing concerns, the producers can effectively determine the "consumption pause" state of the target member destination and only forward to the destinations that are currently in "consumption enabled" state.

In some embodiments, an exemplary new Boolean attribute can be defined for production paused at startup as shown below:

| Attribute Name | Type | Dynamic | Required | Valid values | Default Value |
|---|---|---|---|---|---|
| ProductonPaused AtStartup | Boolean | No | No | "true" or "false" | "false" |

This attribute is optional and can be present in a management object such as MBean in JMS server or other configuration entities for the JMS module descriptor. It is a non-dynamic attribute, i.e., the dynamic change to this attribute value is not going to be effective until the next boot or the re-deployment of the JMS module. The setter and getter methods of this attribute allow the MBean and JMS module descriptor entities to set/get the value of the attribute to the value that is paused. An exception can be thrown in case of invalid value. When a destination is configured in the JMS Module descriptor, the user can choose to have the attribute set explicitly on the destination or can choose to inherit the value from a template, by setting a valid template name to the JMSTemplate attribute of the destination.

In some embodiments, if the hosting JMS server for this destination has this attribute set a valid value (true or false), that value will be used to (override the destination's) determine the "production paused state" of the destination during the startup time irrespective of whether this attribute is explicitly configured on the destination or configured to derive the value from the template. If the hosting JMS server does not have this attribute value configured, the user may explicitly specify the value of this attribute on the destination to a "true" or "false", which will be used to determine the "production paused state" of the destination during the startup time. If this attribute on the destination is not set (not configured, as this is optional attribute), then the value of this attribute is taken from the template, if there is one configured for the destination. If the template also does not set this attribute, then its value shall be assumed as "false".

In some embodiments, the attribute(s) can be exposed via a console as part of the configuration information for JMS destinations as well as JMS server. The console may also provide interface for the administrator to pause the production on a destination or on a JMS server during runtime.

In some embodiments, runtime APIs can be provided to enable the user to pause and resume the new message production on the booted (currently running) destination programmatically. These set of APIs can be present in runtime management objects such as MBeans at both JMS destination and JMS server.

When API, e.g., "pauseProduction( )", is invoked on a JMS destination runtime MBean, it affects only that particular destination's "production paused" state by changing the state of the destination to "production paused". If the destination is currently in "production paused" state or "insertion paused" (descried in next section) state, there will be no impact and no error will be reported. When invoked on a JMS server runtime MBean, it affects the "production paused" state of all the destinations that are hosted by that particular JMS server and overrides whatever the current state of the individual destination.

When API, e.g., "resumeProduction( )", is invoked on a runtime MBean of a destination that is currently in "production paused" state, it shall resume that destination for new message production. The state of the destination shall be marked as "production enabled" thus allowing all the new "producing" activity to continue normally. Invoking this API on a destination that is currently not in "production paused" state has no effect.

When API, e.g., "getProductionPausedState( )", is invoked on a destination runtime MBean, it shall return the current "production paused" state of the destination with one of the following possible values: Production-Enabled, Production-Pausing, or Production-Paused.

In some embodiments, JMS configuration of a JMS server and its destinations shall be modified such that they can be configured to boot in "production paused" state which will result in not allowing message production activities on those destinations immediately after boot. To either allow or disallow the new message production on the destinations, the user will have to later change the state of the destination to "production enabled" by either programmatically or administratively via software interfaces at runtime.

In some embodiments, the destination can be paused for "insertion' (Insertion Pause)" which, in addition to pausing the new message produce operations, all the messages that are result of the in-flight work completion will also be paused from appearing on the destination. When the destination is "resumed from insertion pause", all the messages that are produced from the in-flight work completion are allowed to appear on the destination. In addition, the new message production by new as well as existing producers attached to that destination is allowed to continue their work (produce) on that destination.

In some embodiments, the user can determine whether the there is any pending in-flight work from the return status of the "production pause" operation. When the user pauses the destination for message "insertion", the resulting messages from the in-flight work completion are made "not deliverable" in addition to failing any new message produce operations. Those messages are "invisible" to the consumers but at the same time the statistics will be adjusted to reflect that these messages not "pending" anymore.

Figure 3:
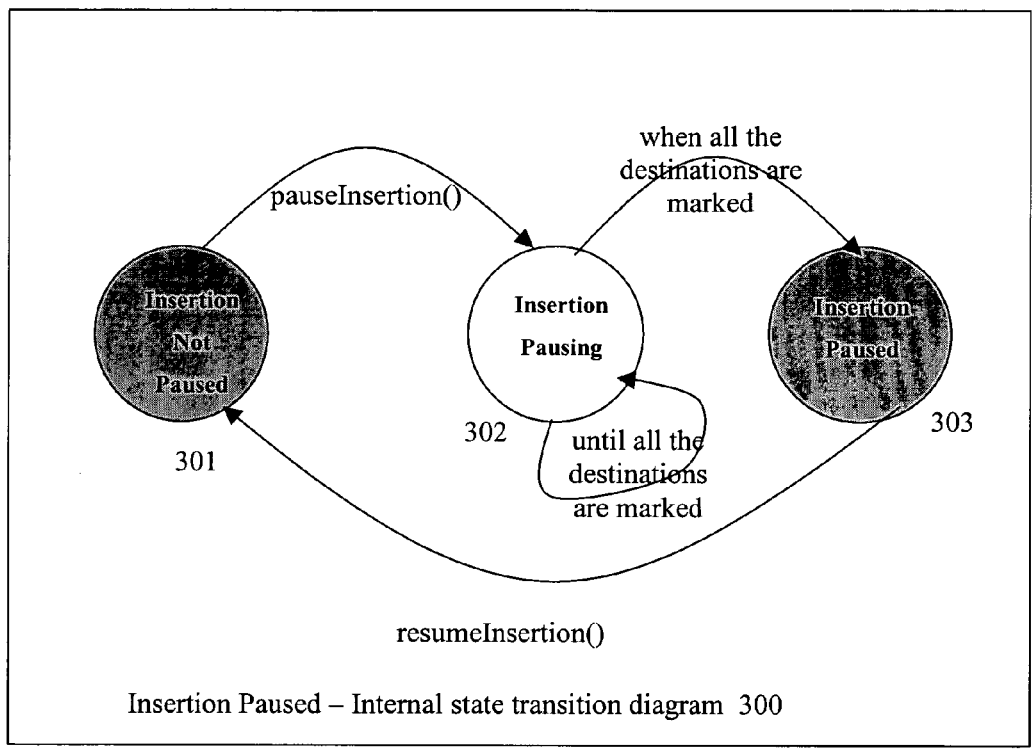
FIG. 3 is an exemplary internal state transition diagram for insertion pause in one embodiment of the present invention.

FIG. 3 is an exemplary internal state transition diagram 300 for insertion pause in one embodiment of the present invention. Destinations that initially at the state of "Insertion Not Paused" 301 can be switched to a transitional "Insertion Pausing" state 302 when the user issues an instruction, e.g., "pause insertion", to pause the destinations from new message insertion. When all the destinations to be paused have been marked, their state switches to the "Insertion Paused" state 303 at which all new insertion operations including those in-flight works will be failed immediately with an exception. Notice that the insertion pause operation can supercede the "production" pause operation described in FIG. 1. In other words, if a destination is currently in "production paused" state, users can (and allowed to) make that destination to go into "insertion paused" state. However, if the destination is currently in "insertion paused" state, then making that destination to "production paused" state does not make any sense and if done, will have no effect on the destination. Thus, the destination can be in one of two message production pause states: "production paused" or "insertion paused" at any given time. After a successful "insertion" pause operation on a destination, the user has to explicitly resume that destination for message insertion via an instruction, e.g., "resumeInsertion", to allow for any in-flight messages to appear on that destination. Successful completion of the insertion "resume" operation will change the state of the destination from "Insertion Pause" 303 to "Insertion not Paused" 301 and all the "invisible" in-flight messages will be made available to all the current consumers at that time of resume. When "insertion" on a destination is successfully paused or resumed either at boot time or at runtime, there will be a log message in the server log indicating the same. In the event of failure to "pause/resume" the message insertion on a destination, the appropriate error/exceptions would be logged.

In some embodiments, a regular producer on a distributed destination will consider the member destination's "insertion" pause state while load balancing the. If the destination's state is "insertion paused", that member destination will not be considered for production by the producer and will be steered away to other members that are available for "normal production" (i.e., in "insertion enabled" state). Since the regular producers are steered away from the "insertion paused" destination, there won't be new messages coming in for the internal system consumers to accumulate. At the same time, the "insertion paused" state of the destination does not affect the internal system consumers from forwarding the messages to the other member (target) destinations. For load balancing concerns, the producer can effectively determine the "consumption pause" state of the target member destination and only forward to the destinations that are currently in "consumption enabled" state.

In some embodiments, an exemplary new Boolean attribute can be defined for the "insertion paused state" of a destination at the boot time as shown below:

| Attribute Name | Type | Dynamic | Required | Valid values | Default Value |
|---|---|---|---|---|---|
| InsertionPausedAtStartup | Boolean | No | No | "true" or "false" | "false" |

This attribute is optional and can be present in a management object such as MBean in JMS server or other configuration entities for the JMS module descriptor. It is also non-dynamic, i.e., the dynamic change to this attribute value is not going to be effective until the next boot or redeployment of JMS module. The setter and getter methods of this attribute can set/get the value of the attribute on the JMS server configuration MBean and the above mentioned entities to the value that is paused. In case of invalid value, an exception is thrown. When a destination is configured in the JMS module descriptor, the user can choose to have the attribute set explicitly on the destination or choose to inherit the value from a template, by setting a valid template name to the JMSTemplate attribute of the destination.

In some embodiments, if the hosting JMS server for this destination has this attribute set a valid value (true or false), that value will be used to (override the destination's) determine the "insertion paused state" of the destination during the startup time irrespective of whether this attribute is explicitly configured on the destination or configured to derive the value from the template. If the hosting JMS server does not have this attribute value configured, the user can explicitly specify the value of this attribute on the destination (to a "true" or "false", which will be used to determine the "insertion paused state" of the destination during the startup time. If this attribute on the destination is not set (not configured, as this is optional attribute) then the value of this attribute is taken from the template if there is one configured for the destination. If the template also has this attribute not set then the value shall be assumed as "false".

In some embodiments, runtime APIs can be provided to enable the user to change the "insertion paused state" of the booted (currently running) destination programmatically. These set of APIs can be present in runtime management objects such as MBeans at both JMS destination and JMS server. When these APIs are invoked on a JMS destination runtime MBean, they affect only that particular destination's "insertion paused" state. When invoked on a JMS server runtime MBean, it affects the "insertion paused" state of all the destinations that are hosted by that particular JMS server and overrides whatever the current state of the individual destination.

When API, e.g., "pauseInsertion( )", is invoked on a runtime MBean of a destination, it changes the state of the destination to "insertion paused". Invoking this API on a runtime MBean of a destination that is currently in "production pause" state, will change that destination state to "insertion paused" (and production enabled). Invoking this API on a runtime MBean of a destination that is currently in "insertion paused" state will have no effect and will not fail or report any error, irrespective of the parameter value.

When API, e.g., "resumeInsertion( )", is invoked on a runtime MBean of a destination that is currently in "insertion paused" state, it will resume that destination to normal production and the state of the destination will be marked as "insertion enabled" thus allowing, all the message "producing" activity including the messages from the in-flight work to continue normally. Invoking this API on a destination that is currently not in "insertion paused" state will have no effect.

When API, e.g., "getInsertionPausedState( )", is invoked on a destination runtime MBean, it will return the current insertion "pause" state of the destination, which can be one of the following possible values: Insertion-Enabled, Insertion-Pausing, and Insertion-Paused.

In some embodiments, an Administration console can expose the attributes as part of the configuration information for JMS destinations as well as JMS server. In addition, the console may provide interface for the administrator to pause the insertion on a destination or on a JMS server during runtime.

In some embodiments, JMS configuration of a JMS server and its destinations can be configured to boot in "insertion paused" state, which will result in not allowing the messages from the in-flight work completion to appear on those destinations immediately after boot. To allow the in-flight work messages to appear on the destination, the user will have to later change the state of the destination to "insertion enabled" by either programmatically or administratively via software interfaces.

In some embodiments, the JMS destination can be "paused for consumption (Consumption Pause)", which would prevent any further consume operations from that destination. When the destination is "resumed from consumption pause", both new and existing consumers attached to that destination are allowed to continue their work (consume) on that destination.

Figure 4:
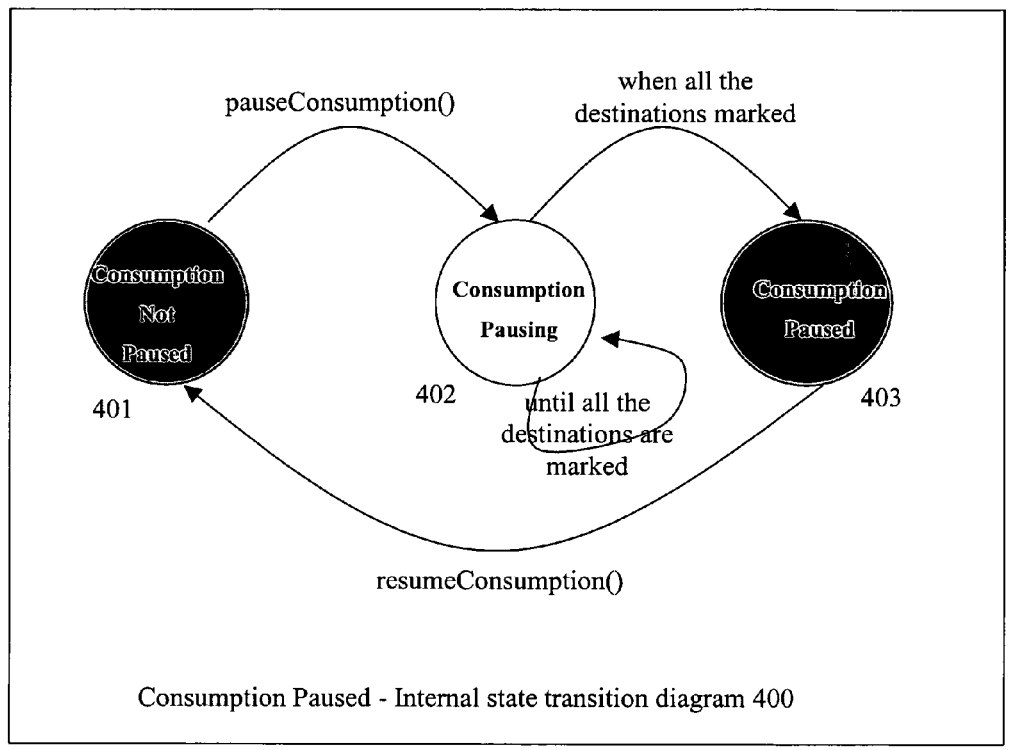
FIG. 4 is an exemplary internal state transition diagram for consumer pause/resume in one embodiment of the present invention.

FIG. 4 is an exemplary internal state transition diagram 400 for consumer pause/resume in one embodiment of the present invention. Destinations that initially at the state of "Consumption Not Paused" 401 can be switched to a transitional "Consumption Pausing" state 402 when the user issues an instruction, e.g., "pauseConsumption". When all the destinations to be paused have been marked, their state switches to the "Consumption Paused" state 403 and all the new synchronous receive operations will be blocked until the destination is resumed and there are messages available for consumption. All the synchronous receive with blocking timeout will block until the timeout happens during the consumption paused state. All the asynchronous consumers attached to that destination will not get any messages delivered to them while the destination in "consumption paused" state. After a successful consumption "pause" operation, the user has to explicitly "resume" the destination to allow for any further consume operations on that destination via an instruction, e.g., "resumeConsumption". When the destination is successfully "paused" for consume operations, there will be a log message in the server log that will indicate the same. In the event of failure to pause the consumers, the appropriate error/exceptions would be logged.

In some embodiments, there can be three message types of consumers in-flight work:
un-acknowledged (pending) messages, which are the messages that are successfully consumed by the clients and are awaiting acknowledgements from the clients. These are "pending messages" which will be removed from the destination/system when the acknowledgement is received irrespective of the destination's state.

messages in the async-consumer pipeline, which are the messages that are pushed to the consumers by the server but are not yet received by the consumers. These messages are un-affected by the consumption pause state, since they are considered as delivered messages by the system.

un-committed messages, which are the messages that are consumed (received) by the clients within a transaction (using either user transaction or transacted session) and the transaction is still not committed or rolled back, when the user tries to "pause" consumption on that destination. The associated destination's current "pause" state is not going to prevent any pending transaction is being able to commit or rollback successfully. When the clients successfully commit the transaction, the messages get removed from the system irrespective of the "consumption pause" state of the destination.

When the user creates a new regular consumer on a distributed destination, the destination members that are currently in "consumption pausing/paused" state will not be considered by the consumer load balancing algorithm. The system's internal consumers (queue forwarders and system subscribers) on a given destination may accumulate messages while that destination is in "consumption pausing" state or in "consumption enabled" state.

In some embodiments, pausing a destination for consumption will prevent Message Driven Bean (MDB) from getting any messages from its associated destination. This feature gives little more flexibility of controlling the message delivery to MDBs from the individual destination level as opposed to previous approach of connection's start/stop. In other words, the JMS Connection can be shared among the multiple MDBs using the consumption pause/resume feature, the user can prevent message delivery to selected MDBs by pausing the associated destination for consumer operations.

In some embodiments, the consumer connection's start/stop may not have any impact on the destination's consumption "pause" state since the behaviors of the two are independent of each other. In other words, if the consumer's connection is "started" from the "stopped" state, the (synchronous) receive operations might block or timeout, and asynchronous consumers will not receive any messages if the associated destination is in "consumption paused" state. Thus, connection start/stop feature simply determines whether the consumer can successfully invoke the receive APIs or not, but the destination's consumption pause/resume feature determines, whether the receive call will get any messages from the destination or not.

In some embodiments, an exemplary new Boolean attribute can be defined for consumption paused at startup as shown below:

| Attribute Name | Type | Dynamic | Required | Valid values | Default Value |
|---|---|---|---|---|---|
| Consumption PausedAtStartup | Boolean | No | No | "true" or "false" | "false" |

This attribute is optional and can be present in JMS server or other configuration entities for the JMS module descriptor. It is also non-dynamic, i.e., the dynamic change to this attribute value is not going to be effective until the next boot or redeployment of JMS Module. The setter and getter methods of this attribute can set the value of the attribute on the configuration MBeans to the value that is paused. In case of invalid value, an exception is thrown. When a destination is configured, the user can choose to have the attribute set explicitly on the destination or to inherit the value from a template, by setting a valid Template name to the JMS template attribute of the destination.

In some embodiments, if the hosting JMS server for the destination has this attribute set a valid value (true or false), that value will be used to (override the destination's) determine the "consumption paused state" of the destination during the startup time irrespective of whether this attribute is explicitly configured on the destination or configured to derive the value from the template. If the hosting JMS server does not have this attribute value configured (directly or from template), the user may explicitly specify the value of this attribute on the destination to a "true" or "false", which will be used to determine the "consumption paused state" of the destination during the startup time. If this attribute on the destination is not set (not configured, as this is optional attribute) then the value of this attribute is taken from the template if there is one configured for the destination. If the template also has this attribute not set then the value shall be assumed as "false".

In some embodiments, runtime APIs can be provided to enable the user to change the "consumption paused" state of the booted (currently running) destination programmatically. These set of APIs are going to be present runtime management objects such as MBeans at both JMS destination and JMS server. When these APIs invoked on a JMS destination runtime MBean, they affect only that particular destination's "consumption paused state". When they are invoked on a JMS server runtime MBean, they affect the "consumption paused state" of all the destinations that are hosted by that particular JMS server and overrides whatever the current state of the individual destination.

When API, e.g., "pauseConsumption( )", is invoked on a destination runtime MBean, it changes the state of the destination to "consumption paused". If this API is invoked from the same/different thread on a runtime MBean of a destination that is currently "consumption paused" state, it has no effect and will not fail or report any error.

When API, e.g., "resumeConsumption( )", is invoked on a runtime MBean of a destination that is currently in "consumption paused" state, it will resume that destination for "normal" consumption and the state of the destination will be marked as "consumption enabled" thus allowing all the "consuming" activity to continue normally. Invoking this API on a destination that is currently not in "consumption paused" state has no effect.

When API, e.g., "getConsumptionPausedState( )", is invoked on a destination runtime MBean, it will return the current consumers "pause" state of the destination with one of the following possible values: Consumption-Enabled, Consumption-Pausing, or Consumption-Paused.

In some embodiments, JMS configuration of JMS server and destinations can be configured to boot in "consumption paused" state so that any consuming activity is disallowed on those destinations immediately after boot. To either allow or disallow the consuming operations on the destinations, the user has to later change this state (resume) for "normal consumption" either programmatically or administratively with the supplied software interfaces at the runtime.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, class, method, type, interface, component, object model, and other suitable concepts. While the concept "interface" is used in the embodiments of the systems and methods described above, it will be evident that such concept can be interchangeably used with equivalent concepts such as, bean, class, method, type, component, object model, and other suitable concepts. While the concept "configuration" is used in the embodiments of the systems and methods described above, it will be evident that such concept can be interchangeably used with equivalent concepts such as, property, attribute, annotation, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a message service, comprising:
 a plurality of destinations, wherein each destination of the plurality of destinations is initially set to production not paused state and operates to:
  receive one or more messages from one or more producers, wherein the one or more producers operate to send the one or more messages to the destinations and publish the one or more messages on the destinations;
  store the one or more messages in a data structure; and
  provide the one or more messages to one or more consumers, wherein the one or more consumers operates to at least one of receive, subscribe, and browse the one or more messages from the destinations, wherein at least one said consumer is separated from said one or more producers; and
 a messaging server, running on one or more microprocessors, that hosts the plurality of destinations, wherein the messaging server operates to:
  determine when a user issues a pause message production request;
  switch the state of the associated destination from production not paused state to a paused state based on the determination;
  receive new messages from one or more producers;
  determine whether every destination in the plurality of destinations is marked with the paused state;
  if every destination in the plurality of destinations is not marked with the paused state allow the one or more producers to attach the new messages to the applicable destinations;
  otherwise, stop attaching the new messages from the one or more producers on any destination in the plurality of destinations;
  allow in-flight work associated with the destinations to complete after the messaging server stops attaching new messages from the one or more producers on the destinations; and
  make one or more messages that are the result of the in-flight work available to the one or more consumers.

2. The system according to claim 1, further comprising:
 a console operable to perform at least one of:
  exposing configuration of the plurality of destinations to the administrator; and
  providing an interface for the administrator to perform its operations.

3. The system according to claim 1, wherein:
 the message service can be Java® Messaging Service (JMS).

4. The system according to claim 1, wherein:
 the message service is operable over a communication network.

5. The system according to claim 1, wherein:
 each of the one or more messages can be one of text, image, voice, telex, fax, e-mail, and paging.

6. The system according to claim 1, wherein:
 the data structure can be a queue.

7. The system according to claim 1, wherein:
 the administrator is operable to perform at boot time and/or runtime.

8. The system according to claim 1, wherein:
 each said producer or consumer is operable in synchronous or asynchronous mode.

9. The system according to claim 1, wherein:
 the in-flight work includes at least one of
  producing, by at least one said producer, an unborn message with a time to deliver set in a future time,
  producing, by at least one said producer, an uncommitted message as part of a transaction that is at least one of not committed and rolled back, and
  delivering a message that is produced by at least one said producer, but is blocked for a specific period of time.

10. The system according to claim 1, wherein:
 the messaging server operates to resume allowing the one or more producers to attach new messages from on the destination, when the destination receives an instruction to resume message production operations.

11. A method to provide a message service, the method comprising:

providing a plurality of destinations, wherein each destination of the plurality of destinations is initially set to production not paused state and operates to:
- receive one or more messages from one or more producers, wherein the one or more producers operate to send the one or more messages to the destinations and publish the one or more messages on the destinations;
- store the one or more messages in a data structure; and
- provide the one or more messages to one or more consumers, wherein the one or more consumers operates to at least one of receive, subscribe, and browse the one or more messages from the destinations, wherein at least one said consumer is separated from said one or more producers; and providing a messaging server that hosts the plurality of destinations, wherein the messaging server operates to:
- determine when a user issues a pause message production request;
- switch the state of the associated destination from production not paused state to a paused state based on the determination;
- receive new messages from one or more producers;
- determine whether every destination in the plurality of destinations is marked with the paused state;
- if every destination in the plurality of destinations is not marked with the paused state allow the one or more producers to attach the new messages to the applicable destinations;
- otherwise, stop attaching the new messages from the one or more producers on any destination in the plurality of destinations;
- allow in-flight work associated with the destinations to complete after the messaging server stops attaching new messages from the one or more producers on the destinations; and
- make one or more messages that are the result of the in-flight work available to the one or more consumers.

12. The method according to claim 11, further comprising: pausing and/or resuming the acceptance of only newly produced message at the plurality of destinations.

13. The method according to claim 11, further comprising: pausing and/or resuming the acceptance of both newly produced message and in-flight work message at the plurality of destinations.

14. A non-transitory machine readable medium having instructions stored thereon that when executed cause a system to:

provide a plurality of destinations, wherein each destination of the plurality of destinations is initially set to production not paused state and operates to:
- receive one or more messages from one or more producers, wherein the one or more producers operate to send the one or more messages to the destinations and publish the one or more messages on the destinations;
- store the one or more messages in a data structure; and
- provide the one or more messages to one or more consumers, wherein the one or more consumers operates to at least one of receive, subscribe, and browse the one or more messages from the destinations, wherein at least one said consumer is separated from said one or more producers; and provide a messaging server that hosts a messaging server to host the plurality of destinations, wherein the messaging server operates to:
- determine when a user issues a pause message production request;
- switch the state of the associated destination from production not paused state to a paused state based on the determination;
- receive new messages from one or more producers;
- determine whether every destination in the plurality of destinations is marked with the paused state;
- if every destination in the plurality of destinations is not marked with the paused state allow the one or more producers to attach the new messages to the applicable destinations;
- otherwise, stop attaching the new messages from the one or more producers on any destination in the plurality of destinations;
- allow in-flight work associated with the destinations to complete after the messaging server stops attaching new messages from the one or more producers on the destinations; and
- make one or more messages that are the result of the in-flight work available to the one or more consumers.

15. A system to provide a message service, comprising:

one or more microprocessors;

means for providing a plurality of destinations, wherein each destination of the plurality of destinations is initially set to production not paused state and operates to:
- receive one or more messages from one or more producers, wherein the one or more producers operate to send the one or more messages to the destinations and publish the one or more messages on the destinations;
- store the one or more messages in a data structure; and
- provide the one or more messages to one or more consumers, wherein the one or more consumers operates to at least one of receive, subscribe, and browse the one or more messages from the destinations, wherein at least one said consumer is separated from said one or more producers;

means for providing a messaging server that hosts the plurality of destinations, wherein the messaging server runs on the one or more microprocessors and operates to:
- determine when a user issues a pause message production request;
- switch the state of the associated destination from production not paused state to a paused state based on the determination;
- receive new messages from one or more producers;
- determine whether every destination in the plurality of destinations is marked with the paused state;
- if every destination in the plurality of destinations is not marked with the paused state allow the one or more producers to attach the new messages to the applicable destinations;
- otherwise, stop attaching the new messages from the one or more producers on any destination in the plurality of destinations;
- allow in-flight work associated with the destinations to complete after the messaging server stops attaching new messages from the one or more producers on the destinations; and
- make one or more messages that are the result of the in-flight work available to the one or more consumers.

16. A system to provide a message service, comprising:
a plurality of destinations, wherein each destination of the plurality of destinations is initially set to production not paused state and operates to:
  receive one or more messages from one or more producers, wherein the one or more producers operate to send the one or more messages to the destinations and publish the one or more messages on the destinations;
  store the one or more messages in a data structure; and
  provide the one or more messages to one or more consumers, wherein the one or more consumers operates to at least one of receive, subscribe, and browse the one or more messages from the destinations, wherein at least one said consumer is separated from said one or more producers; and
a messaging server, running on one or more microprocessors, that hosts the plurality of destinations, wherein the messaging server operates to:
  determine when a user issues a pause message production request;
  switch the state of the associated destination from production not paused state to a paused state based on the determination;
  receive new messages from one or more producers;
  determine whether every destination in the plurality of destinations is marked with the paused state;
  if every destination in the plurality of destinations is not marked with the paused state allow the one or more producers to attach the new messages to the applicable destinations;
  otherwise, stop attaching the new messages from the one or more producers on the destinations;
  allow in-flight work associated with the destinations to complete after the messaging server stops attaching new messages from the one or more producers on the destinations, and make one or more generated messages that are the result of the in-flight work available to the one or more consumers;
  prevent the one or more messages that are result of the in-flight work from appearing on the marked destination.

17. A method to provide a message service, comprising:
providing a plurality of destinations, wherein each destination of the plurality of destinations is initially set to production not paused state and operates to:
  receive one or more messages from one or more producers, wherein the one or more producers operate to send the one or more messages to the destinations and publish the one or more messages on the destinations;
  store the one or more messages in a data structure; and
  provide the one or more messages to one or more consumers, wherein the one or more consumers operates to at least one of receive, subscribe, and browse the one or more messages from the destinations, wherein at least one said consumer is separated from said one or more producers; and
providing a messaging server that hosts the plurality of destinations, wherein the messaging server operates to
  determine when a user issues a pause message production request;
  switch the state of the associated destination from production not paused state to a paused state based on the determination;
  receive new messages from one or more producers;
  determine whether every destination in the plurality of destinations is marked with the paused state;
  if every destination in the plurality of destinations is not marked with the paused state allow the one or more producers to attach the new messages to the applicable destinations;
  otherwise, stop attaching the new messages from the one or more producers on the destinations;
  allow in-flight work associated with the destinations to complete after the messaging server stops attaching new messages from the one or more producers on the destinations, and make one or more generated messages that are the result of the in-flight work available to the one or more consumers; and
  prevent the one or more messages that are result of the in-flight work from appearing on the marked destination.

18. A non-transitory machine readable medium having instructions stored thereon that when executed cause a system to:
provide a plurality of destinations, wherein each destination of the plurality of destinations is initially set to production not paused state and operates to:
  receive one or more messages from one or more producers, wherein the one or more producers operate to send the one or more messages to the destinations and publish the one or more messages on the destinations;
  store the one or more messages in a data structure; and
  provide the one or more messages to one or more consumers, wherein the one or more consumers operates to at least one of receive, subscribe, and browse the one or more messages from the destinations, wherein at least one said consumer is separated from said one or more producers; and
provide a messaging server that hosts a messaging server to host the plurality of destinations, wherein the messaging server operates to:
  determine when a user issues a pause message production request;
  switch the state of the associated destination from production not paused state to a paused state based on the determination;
  receive new messages from one or more producers;
  determine whether every destination in the plurality of destinations is marked with the paused state;
  if every destination in the plurality of destinations is not marked with the paused state allow the one or more producers to attach the new messages to the applicable destinations;
  otherwise, stop attaching the new messages from the one or more producers on the destinations;
  allow in-flight work associated with the destinations to complete after the messaging server stops attaching new messages from the one or more producers on the destinations, and make one or more generated messages that are the result of the in-flight work available to the one or more consumers; and
  prevent the one or more messages that are result of the in-flight work from appearing on the marked destination.

19. A system to provide a message service, comprising:
one or more microprocessors;
means for providing a plurality of destinations, wherein each destination of the plurality of destinations is initially set to production not paused state and operates to:
  receive one or more messages from one or more producers, wherein the one or more producers operate to send the one or more messages to the destinations and publish the one or more messages on the destinations;
store the one or more messages in a data structure; and
provide the one or more messages to one or more consumers, wherein the one or more consumers operates to at least one of receive, subscribe, and browse the one or more messages from the destinations, wherein at least one said consumer is separated from said one or more producers;
means for providing a messaging server that hosts the plurality of destinations, wherein the messaging server runs on the one or more microprocessors and operates to:
determine when a user issues a pause message production request;
switch the state of the associated destination from production not paused state to a paused state based on the determination;
receive new messages from one or more producers;
determine whether every destination in the plurality of destinations is marked with the paused state;
if every destination in the plurality of destinations is not marked with the paused state allow the one or more producers to attach the new messages to the applicable destinations;
otherwise, stop attaching the new messages from the one or more producers on the destinations;
allow in-flight work associated with the destinations to complete after the messaging server stops attaching new messages from the one or more producers on the destinations, and make one or more generated messages that are the result of the in-flight work available to the one or more consumers; and
prevent the one or more messages that are result of the in-flight work from appearing on the marked destination.

* * * * *

UNITED STATES PATENT AND TRADEMARK OFFICE
CERTIFICATE OF CORRECTION

PATENT NO.        : 8,448,182 B2
APPLICATION NO.   : 11/284689
DATED             : May 21, 2013
INVENTOR(S)       : Sengodan It is certified that error appears in the above-identified patent and that said Letters Patent is hereby corrected as shown below:

In the Drawings:

On sheet 4 of 4, in figure 4, line 2, delete "destinations marked" and insert
-- destinations are marked --, therefor.

In the Specification:

In column 2, line 12, delete "willbe" and insert -- will be --, therefor.

In column 4, line 60, delete "ProductonPaused" and insert -- ProductionPaused --, therefor.

In column 6, line 27-28, delete ""pause insertion"," and insert -- "pauseInsertion", --, therefor.

In the Claims:

In column 15, line 39, delete "consumers;" and insert -- consumers; and --, therefor.

In column 15, line 59, delete "to" and insert -- to: --, therefor.

Signed and Sealed this
Tenth Day of September, 2013

Teresa Stanek Rea
*Acting Director of the United States Patent and Trademark Office*